Figure 1:
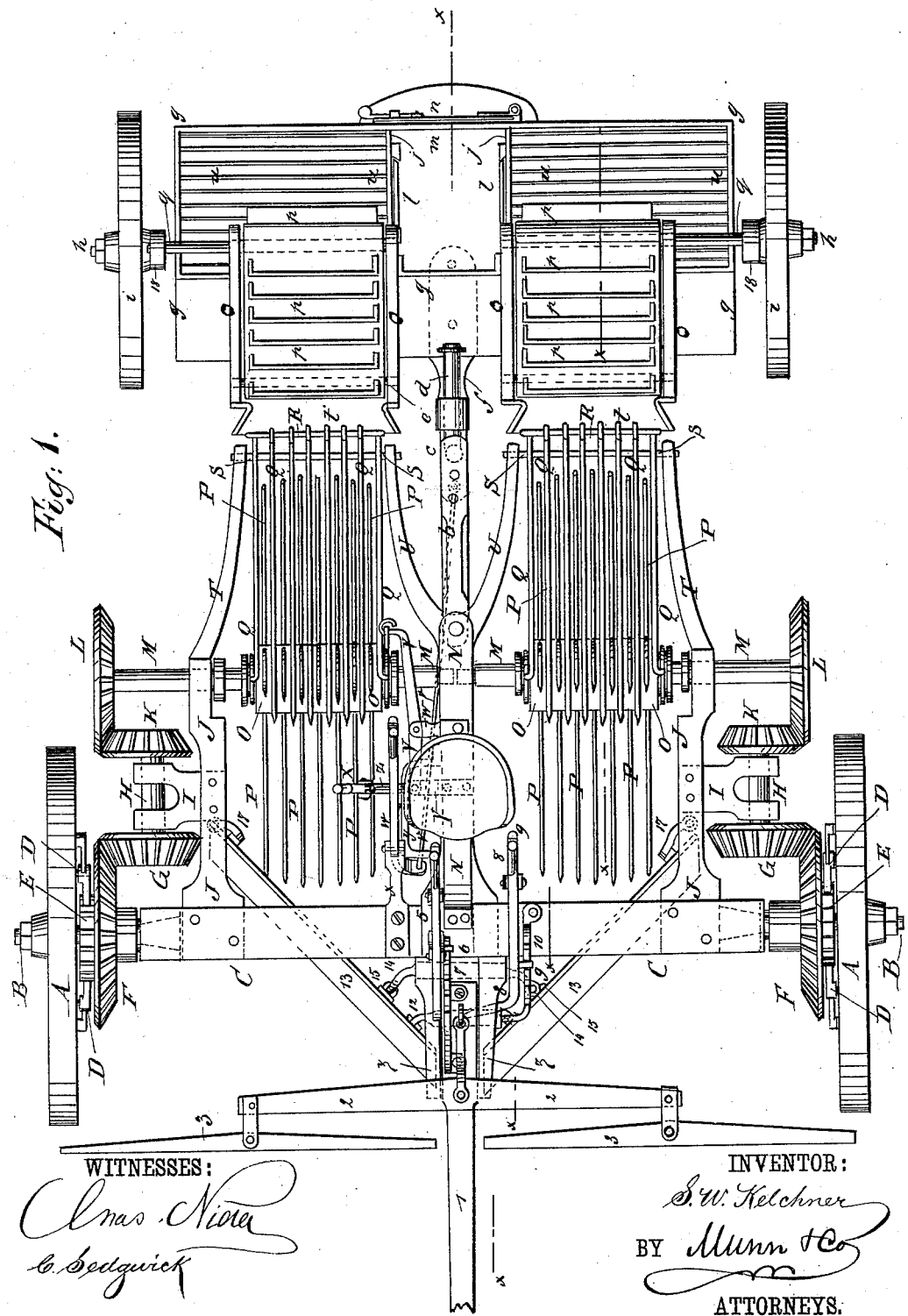

(No Model.)
2 Sheets—Sheet 1.

S. W. KELCHNER.
POTATO DIGGER.

No. 331,505. Patented Dec. 1, 1885.

WITNESSES:
Chas. Nies
C. Sedgwick

INVENTOR:
S. W. Kelchner
BY Munn & Co
ATTORNEYS.

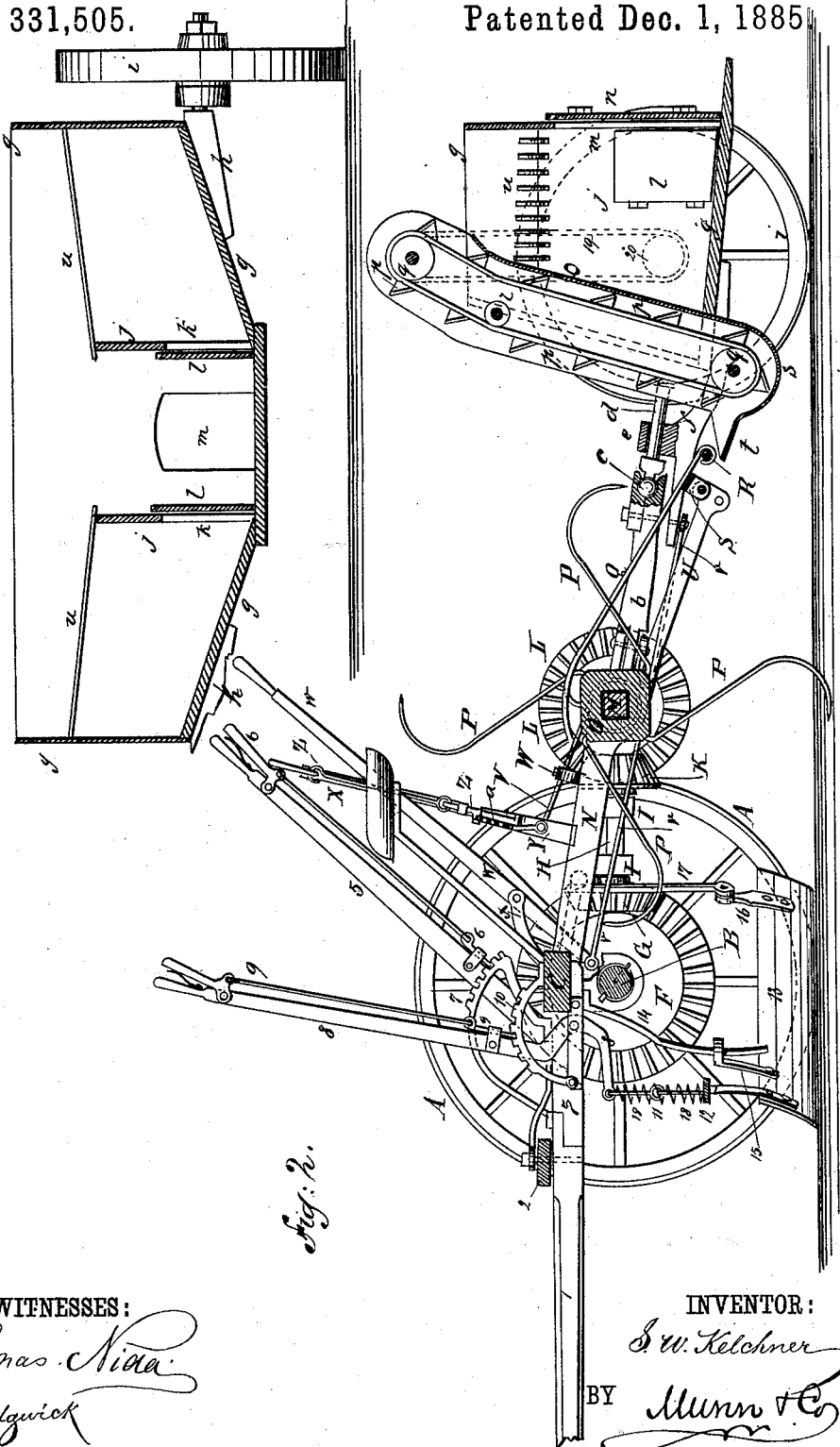

UNITED STATES PATENT OFFICE.

SYLVESTER W. KELCHNER, OF FOWLERSVILLE, PENNSYLVANIA.

POTATO-DIGGER.

SPECIFICATION forming part of Letters Patent No. 331,505, dated December 1, 1885.

Application filed March 27, 1885. Serial No. 160,335. (No model.)

*To all whom it may concern:*

Be it known that I, SYLVESTER W. KELCHNER, of Fowlersville, in the county of Columbia and State of Pennsylvania, have invented a new and Improved Potato-Digger, of which the following is a full, clear, and exact description.

Reference is to be had to the accompanying drawings, forming part of this specification, in which similar letters of reference indicate corresponding parts in all the figures.

Figure 1, Sheet 1, is a plan view of one of my improved potato-diggers. Fig. 2, Sheet 2, is a sectional side elevation of the same, taken through the broken line $x\,x\,x\,x\,x\,x$, Fig. 1. Fig. 3, Sheet 2, is a sectional front elevation of the potato-receiving box, one of the supporting-wheels and its axle being removed.

The object of this invention is to provide machines for digging potatoes, separating them from the soil, and gathering them, which shall be reliable in operation and readily controlled and operated.

The invention consists in the construction and combination of various parts of the digger, as will be hereinafter fully described, and then pointed out in the claims.

A are the drive-wheels, which revolve upon the axles B. The axles B revolve in downwardly-projecting bearings attached to the ends and center of the cross-beam C, so that the operating mechanism will be supported at a suitable distance above the ground.

To the drive-wheels A are attached spring-pawls D, which engage with the teeth of the ratchet-wheels E, formed upon or rigidly connected with the beveled gear-wheels F. The beveled gear-wheels F are rigidly attached to the axles B, and their teeth mesh into the teeth of the beveled gear-wheels G, attached to the forward ends of the short shafts H, which revolve in bearings I, attached to the middle parts of the rearwardly-projecting bars J. The forward ends of the bars J are rigidly attached to the end parts of the cross-beam C.

To the rear ends of the short shafts H are attached beveled gear-wheels K, the teeth of which mesh into the teeth of the beveled gear-wheels L, attached to the outer ends of the shafts M. The shafts M revolve in bearings in the rear ends of the bars J and of the reach N, the forward end of which is rigidly attached to the center of the cross-beam C. The middle parts of the shafts M are made square, and upon them are placed square sleeves O, having square bores, so that the said sleeves O will be carried around by and with the said shafts M in their revolution.

To the angles of the square sleeves O are attached four rows of prongs, P, which incline to the rearward, and have their outer ends curved forward in hook form, as shown in Fig. 2. The prongs P are made of such a length that their curved outer ends, as the sleeves O revolve, will enter the ground to a sufficient depth to pass beneath the potatoes and raise them from the ground, the said prongs being placed so close together that the potatoes cannot pass through the spaces between them, while the soil will pass freely through the said spaces, and will be left upon or will fall back to the ground. As the potatoes are carried up at the forward sides of the sleeves O by the curved prongs P they slide down the said prongs P to the grate-bars Q, the forward parts of which rest upon the sleeves O in such positions that the prongs P will pass between the said bars Q as the sleeves O revolve. The rear ends of the grate-bars Q are attached to the short cross-bars R. The forward ends of the side grate-bars, Q, are coiled around the grooved and rounded ends of the sleeves O, so that the said grates will be kept in proper positions with respect to the said sleeves O and the prongs P.

To the grate-bars Q, near their rear ends, are attached cross-bars S, the outer ends of which are bent downward and are attached to the rear ends of the bars T, rigidly attached at their forward ends to the rear ends of the bars J. The inner ends of the bars S are bent downward, and are attached to the rear ends of the bars U, the forward ends of which are curved toward each other and are secured to the reach N. The rear ends of the bars T U are widened vertically, and have several holes formed through them to receive the fastening-bolts, so that the rear ends of the grates can be adjusted lower or higher to give the said grates a greater or less downward inclination, as may be required.

To the forward part of the inner side-bar, Q, of one or both the grates is pivoted the rear end of a lever, V, which is fulcrumed to a support, W, attached to the side of the reach N. The forward end of the lever V is pivoted to the lower end of the lever X, which is pivoted to a support, Y, attached to the reach N. The lever X is provided with a spring lever-pawl, Z, which engages with a catch-bar, a, attached to or formed upon the support Y, to hold the said lever X securely in any position into which it may be adjusted. By this construction by operating the lever X the sleeve O and digging-prongs P can be adjusted at a greater or less distance apart, as the distance apart of the rows of potatoes may require.

To the rear end of the reach N is hinged the forward end of the bar b, with the rear end of which is connected by a ball-and-socket joint, c, the forward end of the spindle d. The spindle d slides and rocks in a bearing, e, attached to or formed upon the upper side of the forwardly-projecting arm f, the rear end of which is attached to the middle part of the bottom of the potato-receiving box, g. The middle section of the bottom of the box g is horizontal, and the end sections of the said bottom are inclined, as shown in Fig. 3, and to their outer parts are attached the axles h, upon which revolve the wheels i, that carry the said box. The end and middle sections of the box g are separated by partitions j, which have openings k in their lower parts, closed by sliding doors l. In the lower part of the rear side of the middle section is formed an opening, m, closed by a door, n, for convenience in removing the potatoes.

In the forward sides of the end sections of the box g are formed guides o, to receive elevators, the endless chain of buckets p of which pass around rollers q, journaled to the upper and lower parts of the sides of the said guides o. The upper parts of the back of the guides o are bent to the rearward to guide the endless chain of buckets p forward as it passes down from the upper roller, q, so that the potatoes will fall from each bucket as it passes over the said roller without striking against the rear side of the preceding bucket and made to rebound. The forward strand of each endless chain of buckets p is guided in its upward movement by a roller, r, pivoted to the sides of the guides o, and over which the said endless chain passes. The outer journals of the upper rollers, q, are extended, and to them are attached pulleys 18, around which pass endless belts 19. The belts 19 also pass around pulleys 20, formed upon or attached to the inner ends of the hubs of the wheels i, as indicated in dotted lines in Fig. 2, so that the elevators will be driven by the advance of the machine. At the lower ends of the guides o are formed troughs s, into which the potatoes are guided from the grates Q R S by the aprons t, projecting from the forward edges of the said troughs and underlapping the rear ends of the said grates. The end sections of the box g are provided at a little distance from their upper edges with grates u, which incline downward toward the middle section, and the bars of which are placed at such a distance apart that the small potatoes will fall through the said spaces into the said end sections, while the larger potatoes will roll down the said grates into the middle section of the box.

In using the machine, as it is drawn forward the hooked prongs P enter the ground, pass beneath and raise the potatoes and discharge them upon the grates Q R S, down which and the aprons t they roll into the elevator-troughs s, whence they are taken by the endless chain of buckets p and discharged upon the grates u, the smaller potatoes falling through the said grates into the end sections of the box g and the larger potatoes rolling down the said grates into the middle section of the said box. When a sufficient quantity of potatoes has been gathered, the door n is opened and the larger potatoes are removed. The side doors, l, are then opened, and the smaller potatoes are allowed to flow from the end sections of the said box into the middle section, whence they can be readily removed.

To the forward end of the arm f is attached the rear end of a rod, v, which extends forward beneath the reach N and is pivoted at its forward end to the lower end of the lever w. The lever w is fulcrumed to a support, x, attached to the cross-beam C, and is held in any position into which it may be adjusted by a catch-bar, y, attached to the reach N, so that by operating the lever w the box g and its attachments can be readily adjusted closer to or farther from the rear ends of the grates Q R S, as may be required.

To the middle part of the cross-beams C are attached the hounds z, to which is hinged the tongue 1 in the ordinary manner. The tongue 1 is provided with a double-tree, 2, and whiffletrees 3.

To a hound, z, attached to the cross-beam C, is attached the lower end of a lever, 5, so that by operating the lever 5 the cross-beam C will be turned upon the axles B and the hooked prongs P raised from the ground. The lever 5 is provided with a lever-spring pawl, 6, which engages with a catch-bar, 7, attached to the tongue 1, to hold the said lever in any position into which it may be adjusted.

To the hounds z is pivoted the lower part of a lever, 8, which is provided with a spring lever-pawl, 9, to engage with a catch-bar, 10, attached to the cross-beam C and the hounds z, to hold the said lever in any position into which it may be adjusted. The lower end of the lever 8 is bent forward and inward and is connected by a jointed rod, 11, or by links with the center of a bail, 12, the ends of which are attached to the forward parts of the scrapers 13, so that the said forward ends can be adjusted higher and lower and can be raised from the ground by operating the lever 8. The scrapers 13 are guided in their up and down movements, and are supported against the resistance of the soil by rods 14, rigidly attached at their upper ends to the cross-beam C, and the lower parts of which pass through holes in the rearwardly-bent upper ends of the arms 15, attached at their lower ends to the said scrapers 13. To the rear parts of the scrapers 13 are attached short arms 16, which are hinged at their upper ends to the lower ends of rods 17, rigidly attached at their upper ends to the bars J. With this construction the forward ends of the scrapers can be readily raised and lowered to adjust them to the height of the potato hills or ridges, and to raise them from the ground; and the rear ends of the said scrapers will be raised from the ground by the upward movement of the bars J when the cross-beam C is turned to raise the hooked prongs P from the ground. The scrapers 13, as the machine is drawn forward, scrape off the tops of the hills or ridges, removing the stalks, lumps, clods and other rubbish that would interfere with the proper operation of the hooked prongs P.

Around the jointed rod or chain 11 is placed a spiral spring, 18, with its upper end resting against the lever 8 and its lower end resting against the bail 12, so that the scraper 13, should it strike an obstruction, can rise and pass over the said obstruction, and will then be forced back to its place by the said spring 18.

Having thus described my invention, what I claim as new, and desire to secure by Letters Patent, is—

1. In a potato-digger, the combination, with the reach N, the sleeves O, carrying the hooked prongs P, and the grates Q R S, of the levers V X, substantially as herein shown and and described, whereby the machine can be readily adjusted as the distance apart of the rows may require, as set forth.

2. In a potato-digger, the combination, with the reach N, of the hinged bar b, the spindle d, connected with the hinged bar by a universal joint, the arm f, having a bearing to receive the spindle, the box g, mounted upon the wheels and axles i h, and provided with recesses o and aprons t, and the elevators p and their driving mechanism, substantially as herein shown and described, whereby the potatoes will be received from the grates and deposited in the said box, as set forth.

3. In a potato-digger, the combination, with the arm f, attached to the receiving-box g, and the cross-beam C, carried by the wheels and axles A B, of the rod v and lever w, substantially as herein shown and described, whereby the said receiving-box can be adjusted closer to or farther from the conducting-grates as may be required, as set forth.

4. In a potato-digger, the combination, with the receiving-box g, and the elevators p q r, of the partitions j and inclined grates u, substantially as herein shown and described, whereby the potatoes will be sorted as they pass into the said box, as set forth.

5. In a potato-digger, the combination, with the cross-beam C, and the bars J, and hounds z, rigidly attached to the said cross-beam, of the lever and bail 8 12, the guide rods and arms 14 15, the hinged rods and arms 17 16, and the scrapers 13, substantially as herein shown and described, whereby the said scrapers can be adjusted to clean off the tops of the rows, as set forth.

SYLVESTER W. KELCHNER.

Witnesses:
S. H. SWANK,
M. M. HICKS.